United States Patent [19]
Mead et al.

[11] Patent Number: 5,303,329
[45] Date of Patent: Apr. 12, 1994

[54] CONTINUOUS SYNAPTIC WEIGHT UPDATE MECHANISM

[75] Inventors: Carver A. Mead, Pasadena; Janeen D. W. Anderson, Fremont; John C. Platt, Mountain View, all of Calif.

[73] Assignee: Synaptics, Incorporated, San Jose, Calif.

[21] Appl. No.: 805,324

[22] Filed: Dec. 10, 1991

[51] Int. Cl.$^5$ .................. G06G 7/12; H03K 19/21
[52] U.S. Cl. .................................. 395/24; 307/201; 364/807
[58] Field of Search ............... 307/201; 395/24; 364/807; 365/49, 185, 529, 570

[56] References Cited

U.S. PATENT DOCUMENTS

| | | |
|---|---|---|
| 4,950,917 | 8/1990 | Holler et al. ............... 307/201 |
| 4,953,928 | 9/1990 | Anderson et al. ........... 357/23.5 |
| 4,961,002 | 10/1990 | Tam et al. ................. 307/201 |
| 5,028,810 | 7/1991 | Castro et al. .............. 307/201 |
| 5,056,037 | 10/1991 | Eberhardt .................. 364/513 |
| 5,059,920 | 10/1991 | Anderson et al. ........... 330/253 |
| 5,065,040 | 11/1991 | Peterson et al. ........... 307/201 |
| 5,087,583 | 2/1992 | Hazani ..................... 437/43 |
| 5,087,826 | 2/1992 | Holler et al. .............. 307/201 |
| 5,120,996 | 6/1992 | Mead et al. ................ 307/353 |
| 5,136,177 | 8/1992 | Castro ..................... 307/201 |
| 5,150,450 | 9/1992 | Swenson et al. ............ 395/23 |

OTHER PUBLICATIONS

Holler et al., "An Electronically Trainable Artificial Neural Network (ETANN) with 10240 Floating Gate synapses", IJCNN-89, Jun. 1989, II-191 to II-196.
Naruke et al., "A New Flash-Erase EEPROM Cell with a sidewall select gate on its source side," Intl. Electron Devices Meeting 1989, Dec. 1989, 25.7.1-25.7.4.
Chintrakulchai et al., "A Wide-Dynamic-Range Programmable Synapse for Impulse Neural Networks", 1990 IEEE Intl. Symposium on Circuits and Systems, May 1990, 2975-2977.
Lee et al., "Analog Floating-Gate Synapses for General-Purpose VLSI Neural Computation," IEEE Trans. on Circuits and Systems, Jun. 1991, 654-658.
Cauwenberghs et al., "An Adaptive CMOS Matrix-Vector Multiplier for Large Scale Analog Hardware Neural Network Applications," IJCNN-91, Jul. 1991, I-507 to I-511.
Shimabukuro et al., "A Neural Network Synapse Cell in 90 nm SOS," 1991 IEEE SOI Conf. Proceedings, Oct. 1991, 162-163.

Primary Examiner—Michael R. Fleming
Assistant Examiner—Robert W. Doans
Attorney, Agent, or Firm—D'Alessandro, Frazzini & Ritchie

[57] ABSTRACT

A continuous weight-update device for a synaptic element including at least one MOS transistor comprises a floating node having a capacitance associated therewith, the floating gate comprising at least a part of the floating node, first and second input lines, first and second error lines, an electron tunneling structure coupled to the floating node for tunneling electrons from the floating node, and an electron injecting structure coupled to the floating node for injecting electrons onto the floating node. Control circuitry is responsive to signals on the first input and error lines, for activating the electron tunneling structure, and control circuitry is responsive to signals on the second input and error lines, for activating the electron injecting structure. Circuitry is provided for driving signals onto the first and second input and error lines. Both a single synapse and an array of synapses incorporating the continuous weight-update device are also taught.

34 Claims, 4 Drawing Sheets

| $IN_{High}$ | $IN_{Low}$ | $ER_{Low}$ | $ER_{High}$ | $\Delta V_W$ |
|---|---|---|---|---|
| + | − | − | − | + |
| − | + | + | + | + |
| − | + | − | − | − |
| + | − | + | + | − |

CONTINUOUS SYNAPTIC WEIGHT UPDATE MECHANISM

BACKGROUND OF THE INVENTION

1. Field Of The Invention

The present invention pertains to neural networks and to electronic circuits for performing the learning function. More particularly, the present invention pertains to circuits for adjusting a synaptic weight based on the product of an input signal and an error signal.

2. The Prior Art

Many schemes have been proposed to use floating gate structures as weight storage for analog neural networks. Any such network requires a synaptic update mechanism which allows the weight to be changed depending on the combination of an input signal and an error signal. The most popular update rules currently in use implement some form of gradient descent, in which the weight is decreased when the input is of the same sign as the error, and is increased when the input has a sign opposite to that of the error. This form of learning is thus inherently a four quadrant computation. The desirable properties of such an update mechanism when implemented in an analog integrated circuit are small size, ability to work continuously (i.e., to use the signal while it is being updated), and freedom from high-voltage circuitry requirements within the synapse cell itself. The learning rate of such an update mechanism should not vary widely between circuits on the same chip.

Accordingly, it is an object of the present invention to provide a continuous weight-update apparatus for use with a synapse in a neural network.

Another object of the present invention is to provide an encoding of input and error signals, and a circuit for using these encoded signals to compute the control signals for a tunneling structure and a hot-electron injection structure to provide a continuous weight update apparatus.

A further object of the present invention is to provide a neural network including a plurality of synapses, each of the synapses including a continuous weight update-device.

This and other objects of the invention will be apparent to any person of ordinary skill in the art from the description of the invention contained herein.

BRIEF DESCRIPTION OF THE INVENTION

A continuous synaptic weight-update device may be integrated with a synaptic element and comprises a floating node having a capacitance associated therewith, first and second input lines, first and second error lines, an electron tunneling structure coupled to the floating node for tunneling electrons from the floating node, an electron injecting structure coupled to the floating node for injecting electrons onto the floating node, control circuitry responsive to signals on the first input and error lines, for activating the electron tunneling structure, and control circuitry responsive to signals on the second input and error lines, for activating the electron injecting structure.

An array of synaptic elements employing the continuous synaptic weight update device of the present invention may be integrated onto a single integrated circuit, along with driving and sensing circuitry.

DETAILED DESCRIPTION OF A PREFERRED EMBODIMENT

Those of ordinary skill in the art will realize that the following description of the present invention is illustrative only and not in any way limiting. Other embodiments of the invention will readily suggest themselves to such skilled persons.

The function of the synaptic update circuit of the present invention is to continuously control the analog voltage on a floating node comprising the gate of at least one MOS transistor in a synaptic element in response to weight and input signal changes. The synaptic update circuit of the present invention may be integrated into an integrated circuit along with the synaptic element with which it is associated.

In practice, a plurality of synaptic update circuits of the present invention may be integrated on the same integrated circuit as a plurality of floating-gate synaptic elements. Floating gate elements of this type are disclosed in U.S. Pat. No. 4,953,928 to Anderson et al., issued Sept. 4, 1990, and U.S. Pat. No. 5,059,920 to Anderson et al., issued Oct. 22, 1991. A plurality of such elements can be integrated on an integrated circuit substrate to form an integrated neural network as described herein. These United States Patents are expressly incorporated herein by reference as if fully set forth herein.

Figure 1:
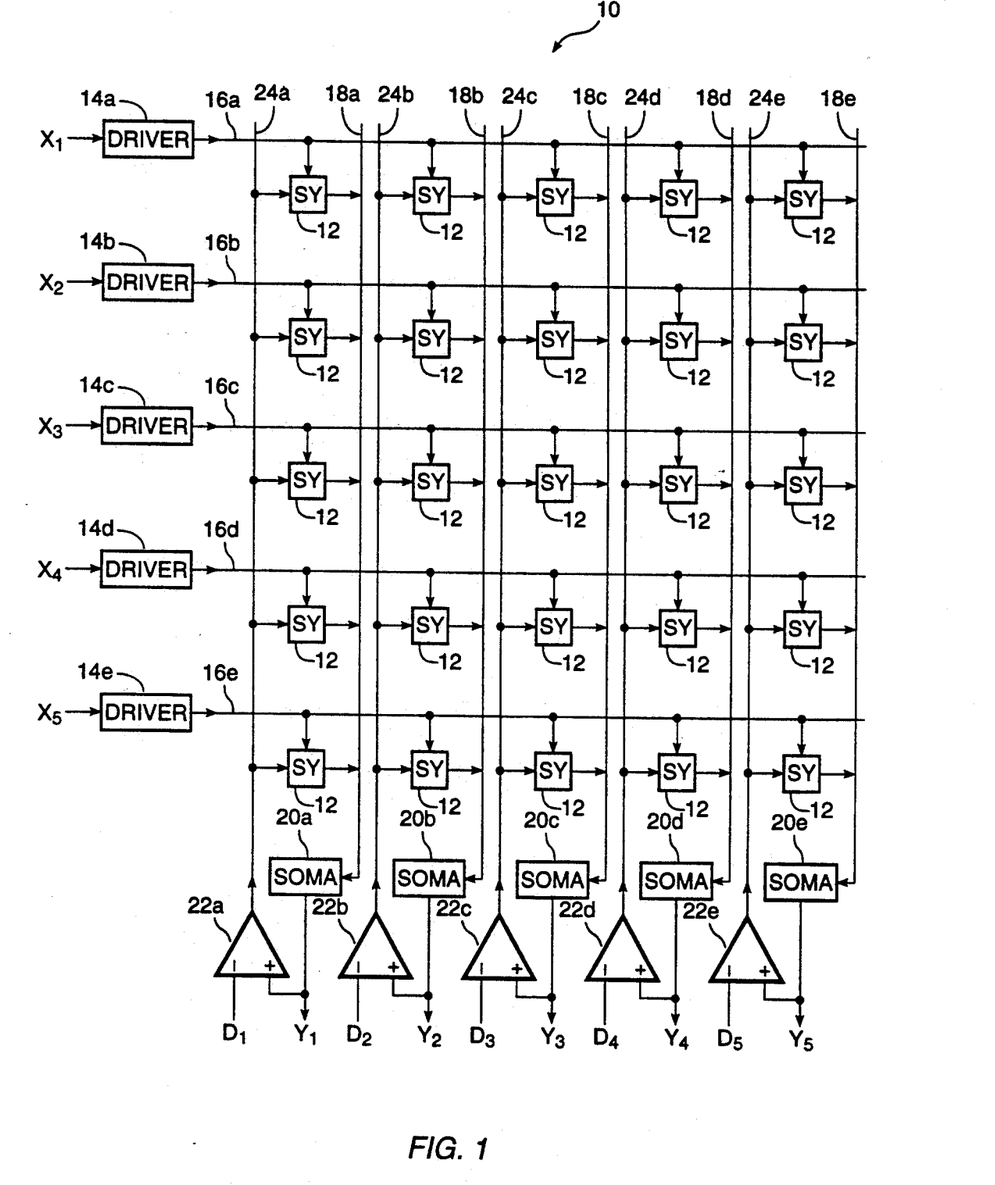
FIG. 1 is a schematic diagram of an illustrative neural network with which the present invention may be utilized.

A typical one-layer electronic neural network is shown schematically in FIG. 1. The neural network 10 may comprise an integrated circuit containing an array of synapses 12. Although FIG. 1 depicts an illustrative 5×5 array of synapses, those of ordinary skill in the art will recognize that, depending on the application, an array of arbitrary size may be provided, limited only by the capabilities of the fabrication technology. A set of input drivers 14a–14e, one for each row in the array, is disposed in the periphery of the integrated circuit surrounding the array area, shown in FIG. 1 along the left side of the array.

A vector of inputs $x_1 \ldots x_5$ are applied in the inputs of driver circuits 14a–14e, each of which produces a voltage on one of a number of input lines 16a–16e which are shown in FIG. 1 running horizontally across the array. In response to these inputs, the network produces a set of outputs $y_1 \ldots y_5$ on output lines 18a–18e, shown in FIG. 1 running vertically across the array. These outputs are computed, according to the standard neural network paradigm, by multiplying each input voltage by a weight value, and summing all of these products associated with a particular column ("neuron") in a summing element, and passing the sum through a non-linear ("soma") element.

In an analog electronic implementation, one weight value is stored in each synapse 12. Circuitry within each synapse 12 is responsible for creating an output current proportional to the product of the input line voltage and the stored synaptic weight value. The output currents of all synapses in a column are typically summed onto a wire (output lines 18a-18e) forming the "dendrite" of the "neutron", and the total current in each column sensed by some kind of current-sense amplifier 20a-20e in the "soma" of that column. An amplifier suitable for this kind of current sensing is described in U.S. Pat. No. 5,165,054, although other known current-sense amplifiers may be employed. This application is expressly incorporated by reference herein.

The simplest synaptic circuit suitable for use as synapse 12 is a single MOS transistor with its source connected to the input line, its drain connected to the output line, and its gate connected to a capacitor storing a charge representing the synaptic weight. When operated with small voltages between source and drain (in its "ohmic region") such a transistor will conduct a current that approximates the product of the input voltage deviation from the output reference voltage and the weight charge. Such synaptic circuits are described in, for example, Tsvidis, Banu, and Khoury, Continuous Time MOSFET-C Filters in VLSI, IEEE Transactions on Circuits and Systems, Vol. CAS-33, No. 2, February 1986, pp. 125-140.

The most powerful and useful property of neural networks like that of FIG. 1 is their ability to learn from examples. When the network of FIG. 1 is to be trained, a desired output vector $D_1 \ldots D_5$ is provided whenever an input vector is present. These desired values are compared with the actual outputs by circuitry associated with each soma, shown as differential amplifiers 22a-22e in FIG. 1. The result of this comparison is a separate error voltage for each output, which is distributed to all synapses within that column on error lines 24a-24e. Learning is achieved by a synaptic weight modification computed within each synapse, based on its row input voltage and column error voltage.

In the canonical gradient descent form of learning, an error charge is computed by multiplying the input by the error, and adding the result, scaled by a learning rate, to the synaptic weight. Prior art methods of updating synaptic weights either require much more chip area than the present invention, or are prone to error due to large variations in tunneling rate between synapses.

Figure 2A:
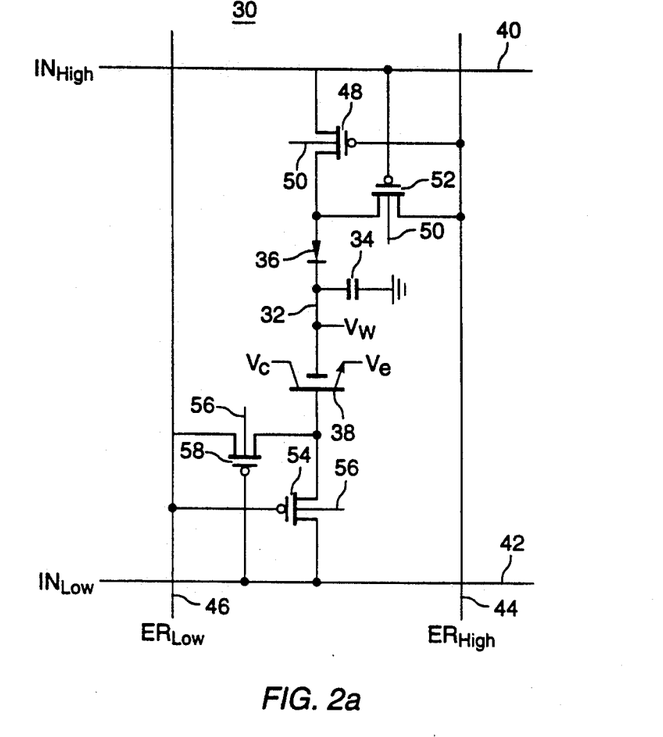
FIG. 2a is a schematic diagram showing a presently preferred embodiment of the synaptic update circuit of the present invention.

A synaptic update circuit 30 according to a presently preferred embodiment of the present invention which may be integrated along with a synaptic element such as that used in the array of FIG. 1 is illustrated in schematic diagram form in FIG. 2a. The weight is represented as a voltage $V_W$ established by a charge on a floating node 32 which forms one plate of capacitor 34. The other plate of capacitor 34 is connected to a fixed voltage, shown as ground in FIG. 2a. Capacitor 34 may be the inherent node-to-substrate capacitance of the circuit structure, or may preferably be increased by formation of an additional capacitive element as is well known in the art.

The charge on floating node 32, and hence its voltage potential $V_W$, may be increased by tunneling electrons from floating node 32 through a tunneling structure, schematically represented by the symbol at reference numeral 36, and may be decreased by injecting electrons onto floating node 32 using a hot-election injection structure schematically represented by the symbol at reference numeral 38. Electron removal and injection structures suitable for employment in the present invention and the manner of their use are known in the art, and are fully described in U.S. Pat. No. 4,953,928. Alternate hot electron injection structures are described in U.S. Pat. No. 4,622,656.

According to a presently preferred embodiment of the present invention, the weight voltage $V_W$ may be altered in response to input and error signals applied to the structure. The input and error signals are doubly represented to avoid high-voltage circuitry within the cell itself. Thus both the tunneling structure and the electron injection structure are driven by a pair of signals. As shown in FIG. 2a, two input lines, line $IN_{High}$ 40 and line $IN_{Low}$ 42 and two error input lines $ER_{High}$ 44 and $ER_{Low}$ 46 are provided. P-channel MOS transistor 48 has its source connected to $IN_{High}$ line 40, its gate connected to $ER_{High}$ line 44, its drain connected to the anode of the tunneling structure 36 and its bulk terminal, typically formed by the well in which it is fabricated, connected to node 50. P-channel MOS transistor 52 has its source connected to $ER_{High}$ line 44, its gate connected to $IN_{High}$ line 40, its drain connected to the anode of the tunneling structure 36, and its bulk also connected to node 50.

Similarly, P-channel MOS transistor 54 has its source connected to $IN_{Low}$ line 42, its gate connected to $ER_{Low}$ line 46, its drain connected to the base of electron injection structure 38, and its bulk to node 56. P-channel MOS transistor 58 has its source connected to $ER_{Low}$ line 46, its gate connected to $IN_{Low}$ line 42, its drain connected to the base of electron injecting structure 38, and its bulk also connected to node 56.

A positive input is encoded as an increased voltage on $IN_{High}$ input line 40, and a similar decrease on $IN_{Low}$ input line 42. A negative input is encoded as a decreased voltage on $IN_{High}$ input line 40, and a similar increase on $IN_{Low}$ input line 42. The error signal is represented in like manner as a simultaneous increase or decrease on $ER_{High}$ and $ER_{Low}$ error lines 44 and 46. $IN_{Low}$ input Line 42 and $ER_{Low}$ error line 46 operate at low voltages (i.e., 3-5 volts), compatible with normal analog circuitry operating in the substrate of the chip. However $IN_{High}$ input line 40 and $ER_{High}$ error line 44 operate at high voltages (i.e., 18 volts), well above those required to induce tunneling in tunneling structure 36. Because tunneling current is an exponential function of the voltage on the anode of tunneling structure 36, the voltage on that node need be changed by only a few volts to change the tunnel current by many orders of magnitude.

The floating node 32 may be formed by a layer of polysilicon. The anode of tunneling structure 36 may be formed either by a second layer of polysilicon separated from the first layer of polysilicon by an insulating layer, or by a diffusion underlying the first layer of polysilicon and separated from it by a layer of gate oxide. Although the different tunneling structures on a single chip may vary in their tunnel current at a given voltage by more than an order of magnitude, for a given desired tunnel current, all junctions will typically require a voltage on the anode of the tunneling structure which differ from one another by only about one volt. For this reason, P-channel MOS transistors 48 and 52 are used as current sources to supply the desired tunnel current. These transistors are formed within a well 50 held at high voltage, and thus never need to support a large voltage difference along their channels. The condition of zero input is represented by $IN_{High}=V_{RH}$ and $IN_{Low}=V_{RL}$, where $V_{RH}$ is a high voltage reference level and $V_{RL}$ is a low voltage reference level. The condition of zero error is represented by $ER_{High}=V_{RH}$ and $ER_{Low}=V_{RL}$.

When $IN_{High}$ input 40 is positive and $ER_{High}$ error line 44 is negative with respect to the high voltage reference level $V_{RH}$, P-channel MOS transistor 48 is allowed to conduct. Similarly, when $ER_{High}$ input line 40 is negative and $ER_{High}$ error line 44 is positive, P-channel MOS transistor 52 is allowed to conduct. When both $IN_{High}$ input line 40 and $ER_{High}$ error line 42 are held at $V_{RH}$, the current through transistors 48 and 52 is very small; its level can be adjusted by setting the voltage on well 50 relative to $V_{RH}$ using the well-known back-gate effect on transistors 48 and 52. Tunneling can be disabled completely by lowering both well voltage and $V_{RH}$. Those of ordinary skill in the art will appreciate that $V_{RL}$ should be chosen such that the circuit will operate on the desired portion of the floating gate injection curve as described in U.S. Pat. No. 4,953,928 and that $V_{RH}$ should be chosen such that the circuit will operate on the desired portion of the tunneling curve.

The tunneling structure, together with P-channel MOS transistors 48 and 52, thus implements two of the four quadrants of the weight update computations. The other two quadrants are implemented by the combination of the hot-electron injection structure 38 and P-channel MOS transistors 54 and 58. As described in U.S. Pat. No. 4,953,928, the injected current is proportional to the base current of injection structure 38. When $IN_{Low}$ input line 42 is made positive with respect to the low voltage reference level $V_{RL}$, and $ER_{Low}$ error line 46 is simultaneously made negative with respect to $V_{RL}$, current flows through P-channel MOS transistor 54 into the base of injection structure 38, thereby enabling hot electrons to be injected on to floating node 32, causing $V_W$ to become more negative. Similarly, a positive excursion of $ER_{Low}$ error line 46, together with a negative excursion of $IN_{Low}$ input line 42, will allow current to flow through P-channel MOS transistor 58, also causing $V_W$ on floating node 32 to become more negative. Electron injection can be completely disabled by decreasing the voltage ($V_C$) at the collector of the bipolar transistor of electron injecting structure 38 to a value near $V_e$, the voltage at its emitter. According to an alternate embodiment of the invention, the base of the electron injection device may be connected to a fixed voltage and the drains of the two P-channel MOS transistors 54 and 58 may be connected to the collector of the injection device.

Figure 2B:
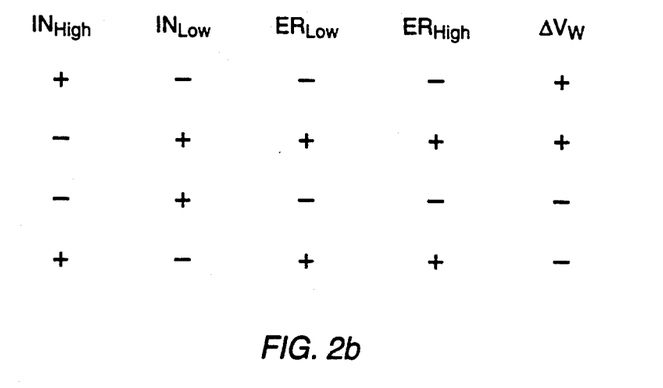
FIG. 2b is a chart illustrating the weight changes for various combinations of input and error signals.

FIG. 2b is a chart illustrating the weight changes as a function of the polarities of $IN_{HIGH}$, $IN_{LOW}$, $ER_{HIGH}$ and $ER_{LOW}$ for this particular coding of input and error signals.

While the environment of the present invention was described generally as the generic synapse illustrated in FIG. 1, those of ordinary skill in the art will recognize from the disclosure herein that the weight voltage $V_W$ on floating node 32 can be used as the gate voltage on either one or more N-channel or a P-channel MOS transistors, in any of the well-known synaptic configurations, either single-ended or differential simply by making floating node 32 the gate of the device or devices it is desired to control. If a single-ended P-channel synapse is used, the signs of the error voltages will be reversed from that described above. As will be appreciated by those of ordinary skill in the art, other encodings of the input and error signals are possible.

Figure 3A:
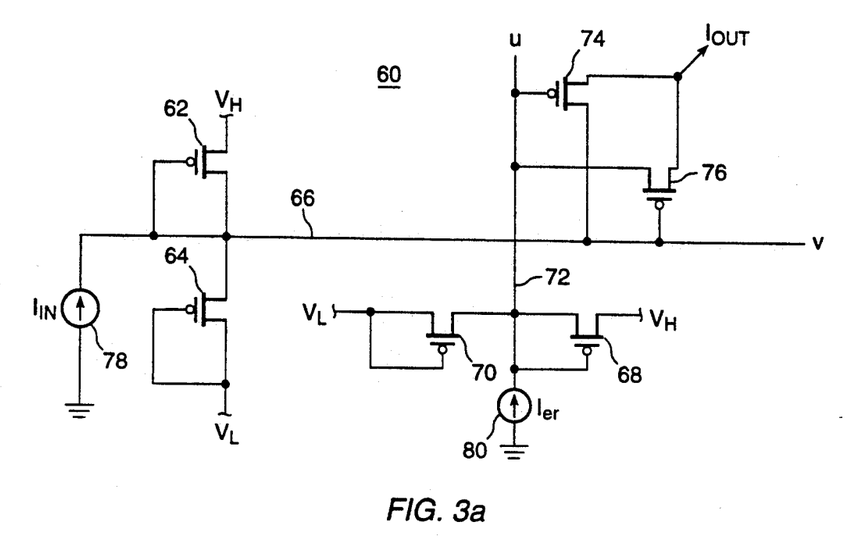
FIGS. 3a and 3b are schematic diagrams of presently preferred circuits for providing input and error signals to the continuous circuit of the present invention.
Figure 3B:
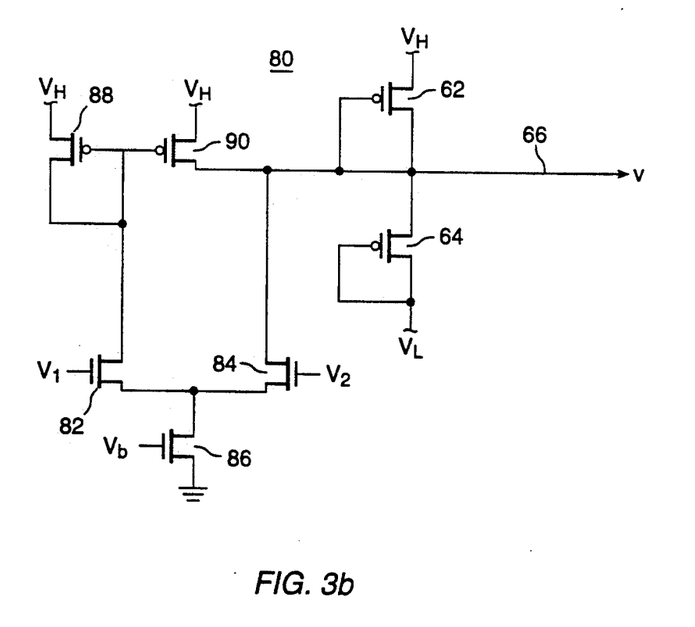

Referring now to FIGS. 3a and 3b, exemplary circuitry for providing the $IN_{HIGH}$, $IN_{LOW}$, $ER_{HIGH}$ and $ER_{LOW}$ inputs is shown in schematic diagram form. Referring first to FIG. 3a, a circuit 60 comprising diode-connected P-channel MOS transistors 62 and 64 and driving line 66 and diode-connected P-channel MOS transistors 68 and 70 and driving line 72 is shown. Those of ordinary skill in the art will recognize that driving lines 66 and 72 and the P-channel MOS transistors 74 and 76 connected thereto are equivalent to either lines 40 and 44 and P-channel MOS transistors 48 and 52, or lines 42 and 46 and P-channel MOS transistors 54 and 58 of the synapse of FIG. 2a. P-channel MOS transistor 62 has its source connected to a voltage source $V_H$ and its gate and drain connected to line 66. P-channel MOS transistor 64 has its source connected to line 66 and its gate and drain connected to voltage source $V_L$, less positive in magnitude than $V_H$. Similarly, P-channel MOS transistor 68 has its source connected to a voltage source $V_H$ and its gate and drain connected to line 72. P-channel MOS transistor 70 has its source connected to line 72 and its gate and drain connected to voltage source $V_L$. The input to line 66 is represented by a bi-directional current $I_{in}$ shown at reference numeral 78 and the input to line 72 is represented by a bi-directional current $I_{er}$ shown at reference numeral 80. As shown in FIG. 3a, driving line 66 has a voltage of v on it and driving line 72 has a voltage of u on it.

As described in Carver A. Mead, Analog VLSI and Neural Systems, pp. 35–36, Addison-Wesley Publishing Co. 1989, a P-channel MOS transistor generates a drain current from a voltage $V_S$ on its source and a voltage $V_G$ on its gate, with respect to $I_o$, a current proportional to the width to length ratio of the transistor:

$$I_D = I_o e^{V_S - kV_G} \qquad [1]$$

where k is a constant slightly less than 1 and all voltages are in units of kT/q.

The arrangement of two P-channel transistors 74 and 76 acts as a two-quadrant multiplier when configured as shown in FIG. 3a.

From Equation [1], for $I_{in}$ negative and $I_{er}$ positive:

$$I_{out} \approx e^{(u-kv)} \qquad [2]$$

Under these conditions:

$$-I_{in} \approx e^{(VH-kv)} \text{ and } I_{er} \approx e^{(u-kVL)} \qquad [3,4]$$

Therefore:

$$I_{out} \approx -I_{in}I_{er}e^{(kVL-VH)} \qquad [5]$$

For $I_{in}$ positive and $I_{er}$ negative:

$$I_{out} \approx e^{(v-ku)} \qquad [6]$$

$$I_{in} \approx e^{(v-kVL)} \text{ and } -I_{er} \approx e^{(VH-ku)} \qquad [7,8]$$

Therefore:

$$I_{out} \approx -I_{in}I_{er}e^{(kVL-VH)} \qquad [9]$$

The previous expressions for $I_{er}$ and $I_{in}$ assume that the magnitudes of $I_{er}$ and $I_{in}$ are larger than the bias currents flowing through P-channel MOS transistors 62, 64, 68, and 70. If $|I_{in}|$ is less than the bias current, then the voltage v will be very close to its resting ($I_{in}=0$) value $V_R$. Similarly, if $|I_{er}|$ is less than the bias current, then the voltage u will also be very close to its resting ($I_{er}=0$) value $V_R$.

The diode-connected P-channel MOS transistors 62, 64, 68, and 70 perform three functions. First, they transform the input and error currents into voltages u and v. Next, they scale down the input current by the factor $\exp[(V_H-k^2V_L)/(1-k)]$, allowing the input and error lines to be strongly driven (fast) while still reliably generating small output currents. This feature is especially important in the high voltage tunneling current. Third, they provide a "flat spot" for input currents less than the bias current, so that random offsets do not generate appreciable learning effects.

It can readily be seen that when $I_{in}$ and $I_{er}$ are of opposite sign, it is possible to generate an exponentially larger output current than when they are of the same sign. Therefore, the circuit shown in FIG. 3a can act as the two quadrant multiplier element for either the weight increase or decrease mechanism in an on-chip learning system. Of course, one driver circuit is required for each input line and each error line. For certain applications where no flat spot is desired, the diode-connected transistors 62 and 64 may be omitted entirely, and their function may be subsumed by the synapse transistors 74 and 76 of all synapses in the row. This arrangement leads to a normalization wherein the total learning charge in a row is set by the input current. A similar simplification of the error driving circuitry may also be desirable for certain applications. That arrangement leads to a normalization whereby the total weight increment or decrement for the neuron is controlled by the error current.

Referring now to FIG. 3b, a transconductance amplifier circuit 80 is shown for generating the current $I_{in}$ or $I_{er}$ from a differential voltage $V_1$-$V_2$. The circuit 80 includes first and second N-channel MOS input transistors 82 and 84, having their gates connected to voltage input nodes for $V_1$ and $V_2$ and their sources commonly connected to the drain of an N-channel MOS bias transistor 86, having its source connected to a voltage source, such as ground, and its gate connected to a source of bias voltage $V_b$. Those of ordinary skill in the art will recognize that the differential driver transistors 82 and 84 used in the drivers for $IN_{high}$ and $ER_{High}$ input lines must operate at drain voltages larger than those at which MOS transistors in a typical CMOS process are capable of withstanding. Any skilled person will know how to employ lightly-doped drain techniques to enable these transistors to operate at the desired voltages.

The circuit of FIG. 3b operates as disclosed in Carver A. Mead, Analog VLSI and Neural Systems, pp. 70–71, Addison-Wesley Publishing Co. 1989. The drains of MOS input transistors 82 and 84 are connected to the drains of P-channel MOS current-mirror transistors 88 and 90. The circuit node comprising the common drain connection of MOS transistors 84 and 90 is the output node connected to driving line 66 or 72 of the circuit of FIG. 3a. In fact, for clarity, the output node is shown connected to MOS transistors 62 and 64 of FIG. 3a. Those of ordinary skill in the art will appreciate that, in a large array where lines 66 and 72 are long and have appreciable capacitance, it may be advisable to connect the circuit of 3b to those lines through a buffer, preferably of unity gain.

To operate the circuit of FIG. 3b in the present invention, the bias current of the differential pair of MOS transistors 82 and 84 should be set by $V_b$ to be greater than the bias current through transistors 62 and 64 (set by $V_H$-$V_L$), otherwise, the synaptic current $I_{out}$ could never become large enough for the multiplier action to operate properly.

Figure 4:
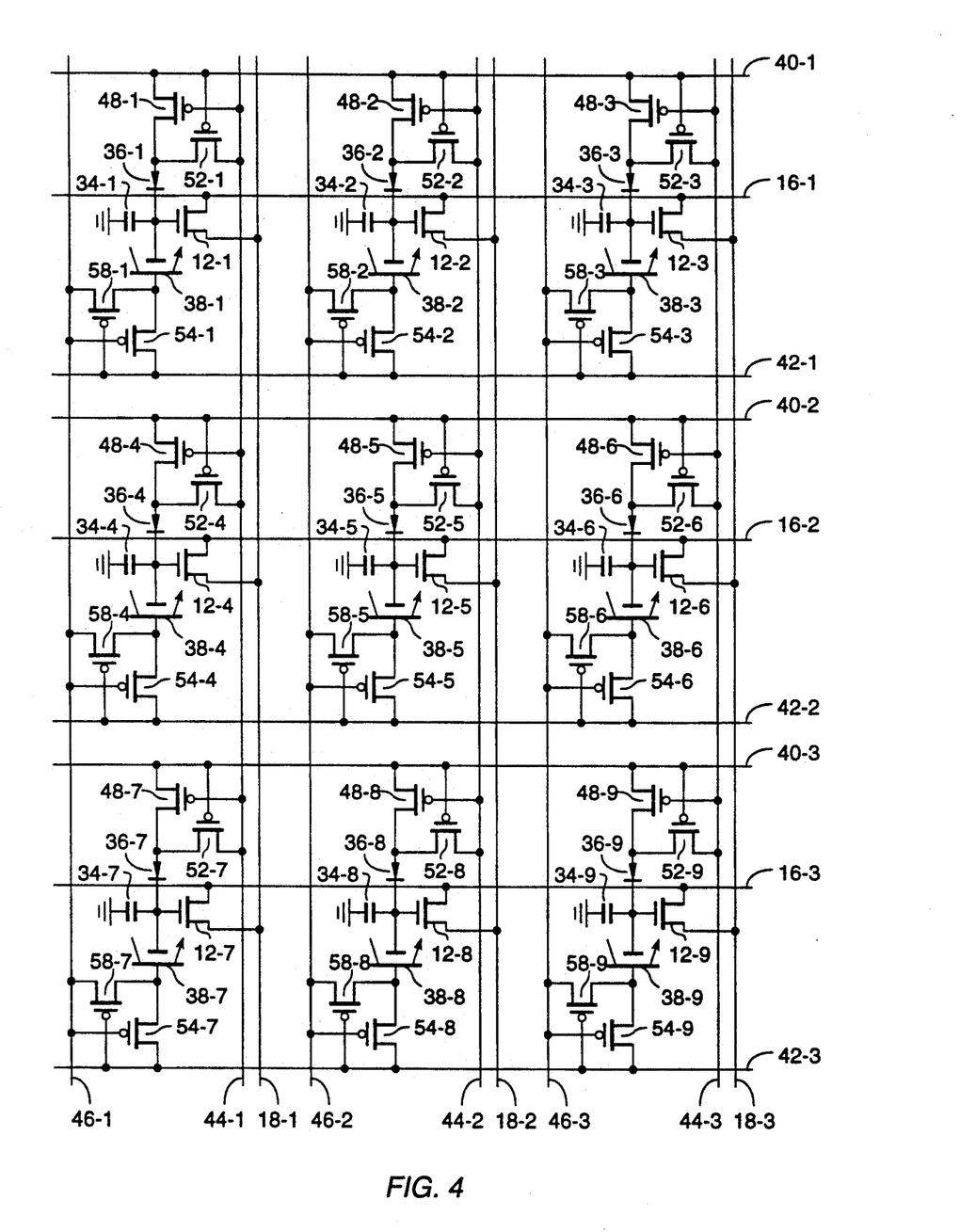
FIG. 4 is a schematic diagram of an illustrative 3×3 array of synapses, each including synaptic update circuits according to the present invention.

Referring now to FIG. 4, an array 80 of synapses 12 including continuous synaptic weight-update devices according to the present invention is shown in schematic form. As shown in FIG. 4, each synapse 12 in array 80 is a continuous synaptic weight-update element. The numbering of the elements in each weight-update element in the array follows the numbering of these elements in FIG. 2. The array of FIG. 4 is shown having three rows and three columns. Thus, the first row includes synapses 12-1, 12-2, and 12-3, the second row includes synapses 12-4, 12-5, and 12-6, and the third row includes synapses 12-7, 12-8, and 12-9. In the array of FIG. 4, the synapses 12-1 through 12-9 are shown as N-channel MOS transistors having their gates connected to the floating gate 32 of the weight update circuit. The drains of synaptic elements 12-1, 12-2, and 12-3 in the first row of the array are connected to an input line 16-1, the drains of synaptic elements 12-4, 12-5, and 12-6 in the second row of the array are connected to an input line 16-2, and the drains of synaptic elements 12-7, 12-8, and 12-9 in the third row of the array are connected to an input line 16-3. The sources of synaptic elements 12-1, 12-4, and 12-7 in the first column of the array are connected to an output summing line 18-1, the sources of synaptic elements 12-2, 12-5, and 12-8 in the second column of the array are connected to an output summing line 18-2, and the sources of synaptic elements 12-3, 12-6, and 12-9 in the third column of the array are connected to an output summing line 18-3. Those of ordinary skill in the art will recognize that synaptic elements other than simple MOS transistors may be employed.

Those of ordinary skill in the art will recognize that the embodiment of FIG. 4 is illustrative only and is presented for the purpose of showing the interaction between the various elements. Arrays of arbitrary size are possible using the principles of the present invention. The input lines 16-1 to 16-3 may be the same as low voltage input lines 42-1 to 42-3, or may be driven by a separate driver circuit, such as that shown in FIG. 3b.

$IN_{High}$ and $IN_{Low}$ input lines 40-1 and 42-1, respectively, are associated with weight-update elements 30-1, 30-2, and 30-3 in the first row of the array through transistors 48-(1,2,3), 52-(1,2,3), 54-(1,2,3), and 58-(1,2,3). $IN_{High}$ and $IN_{Low}$ input lines 40-2 and 42-2, respectively, are similarly associated with weight-update elements 30-4, 30-5, and 30-6 in the second row of the array through their corresponding MOS transistors. $IN_{High}$ and $IN_{Low}$ input lines 40-3 and 42-3, respectively, are similarly associated with weight-update elements 30-7, 30 8, and 30-9 in the third row of the array through their corresponding MOS transistors.

$ER_{High}$ and $ER_{Low}$ error lines 44-1 and 46-1, respectively, are associated with weight-update elements 30-1, 30-4, and 30-7 in the first column of the array through MOS transistors 48-(1,4,7), 52-(1,4,7), 54-(1,4,7), and 58-(1,4,7). $ER_{High}$ and $ER_{Low}$ error lines 44-2 and 46-2, respectively, are similarly associated with weight-update elements 30-2, 30-5, and 30-8 in the second column of the array through their corresponding MOS transistors. $ER_{High}$ and $ER_{Low}$ error lines 44-3 and 46-3, respectively, are similarly associated with weight-update elements 30-3, 30-6, and 30-9 in the third column of the array through their corresponding MOS transistors.

Each $IN_{Low}$ line 42-(1,2,3) and synapse input lines 16-(1,2,3) are preferably driven by a circuit as shown in FIG. 3b. The $V_1$ input to each transconductance amplifier circuit is driven by the corresponding external input to the system. The $V_2$ input to each circuit is set to a common reference voltage, typically 2-3 volts. The $V_H$ and $V_L$ values for the circuit are selected to set $V_{RL}$ at the desired voltage to set the operation of the hot-electron injection devices 38-1 through 38-9 at the desired point on their operating curve. Because the $V_2$ input to each circuit is set to a common reference voltage, input voltages on the $V_1$ input having values above this reference voltage produce positive output currents and input voltages below this reference voltage produce negative output currents from the transconductance amplifier.

In embodiments where the synapse input lines 16-(1,2,3) are separately driven, it may sometimes be desirable to omit the diode-connected transistors 62 and 64 from these input drivers. This arrangement results in an input normalization for which the total output current is equal to the total input current. The current will be weighted by the synaptic elements.

Each $ER_{Low}$ line 46-(1,2,3) is also preferably driven by a circuit as shown in FIG. 3b. The $V_1$ input to each transconductance amplifier circuit is driven by the desired output for the neuron. The $V_2$ input to each transconductance amplifier circuit is driven by the actual output of the neuron. The $V_H$ and $V_L$ values for the circuit are selected to set $V_{RL}$ at the desired voltage to set the operation of the hot-electron injection devices 38-1 through 38-9 at the desired point on their operating curve and are preferably selected to be the same as these voltages for the circuits driving the low-voltage input lines.

Each $IN_{High}$ line 40-(1,2,3) is also preferably driven by a circuit as shown in FIG. 3b. The $V_1$ input to each transconductance amplifier circuit is set to a common reference voltage, typically the same as the reference voltages for the $IN_{Low}$ drivers. The $V_2$ input to each transconductance amplifier circuit is driven by the corresponding external input to the system. The $V_H$ and $V_L$ values for the circuit are selected to set $V_{RL}$ at the desired voltage to set the operation of the tunneling structures 36-1 through 36-9 at the desired point on their operating curve.

Each $ER_{High}$ line 44-1 through 44-3 is also preferably driven by a circuit as shown in FIG. 3b. The $V_1$ input to each transconductance amplifier circuit is driven by the desired output of the neuron. The $V_2$ input to each transconductance amplifier circuit is driven by the actual output of the neuron. The $V_H$ and $V_L$ values for the circuit are selected to set $V_{RL}$ at the desired voltage to set the operation of the tunneling structures 36-1 through 36-9 at the desired point on their operating curve.

The combination of two drivers for the $ER_{High}$ and $ER_{LOW}$ lines are thus equivalent to the differential amplifiers 22a-22e shown schematically in FIG. 1. Providing two driver amplifiers, one operating at high voltages and one at low voltages allows the synapse to be built without internal high voltage circuitry.

Bulk terminals 50 of MOS transistors 48 and 52 are all preferably connected to a common bias voltage, larger than that required for the maximum rate of electron tunneling to be used in the system. This bias voltage should also be enough larger than $V_{RH}$ so that when the $ER_{High}$ and $IN_{High}$ voltages are equal to $V_{RH}$, the drain currents of transistors 48 and 52 are smaller than the minimum charging rate tolerable on the capacitors inherent in the floating gates. Bulk terminals 56 of MOS transistors 54 and 58 are typically connected to the VDD potential of the integrated circuit.

The array of FIG. 4 is an example of, and operates in the same manner as the array of FIG. 1. It may be continuously updated while in operation by applying appropriate voltages to the weight update elements via the appropriate input and error lines.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A continuous synaptic weight-update device comprising:
    a single floating node having a capacitance associated therewith;
    first and second signal input lines;
    first and second error input lines;
    electron tunneling means, connected to said floating node, for tunneling electrons from said floating node;
    hot electron injecting means, connected to said floating node, for injecting hot electrons onto said floating node;
    first driving means for driving voltages on said first signal input line and said first error input line in opposite directions with respect to a first reference voltage when it is desired to remove electrons from said floating node;
    second driving means for driving voltages on said second signal input line and said second error input line in opposite directions with respect to a second reference voltage when it is desired to place electrons onto said floating node;
    first control means, responsive to the product of said voltages on said first signal input line and said first error input line, for activating said electron tunneling means; and
    second control means, responsive to the product of said voltages on said second signal input line and said second error input line, for activating said hot electron injecting means.

2. The continuous synaptic weight-update device of claim 1 wherein said first control means comprises a first MOS transistor having a source and drain connected between said first signal input line and said electron tunneling means and a gate connected to said first error input line and a second MOS transistor having a source and drain connected between said first error input line and said electron tunneling means and a gate connected to said first signal input line and wherein said second control means comprises a third MOS transistor having a source and drain connected between said second signal input line and said hot electron injecting means and a gate connected to said second error input line and a fourth MOS transistor having a source and drain connected between said second error input line and said hot electron injecting means and a gate connected to said second signal input line.

3. The continuous synaptic weight-update device of claim 1 wherein said first driving means includes a first bi-directional current source for injecting a first current onto said first signal input line, said first current derived from a source of input signals, and a second bi-directional current source for injecting a second current onto said first error input line, said second current derived from a source of error signals, and wherein said second driving means includes a third bi-directional current source for injecting a third current onto said second signal input line, said third current derived from said source of input signals, and a fourth bi-directional current source for injecting a fourth current onto said fourth signal input line, said fourth current derived from said source of error signals.

4. The continuous synaptic weight-update device of claim 3 wherein said first, second, third, and fourth bi-directional current sources comprise first, second, third, and fourth transconductance amplifiers, one input of said first and third transconductance amplifiers connected to said source of input signals, the inputs of said second and fourth transconductance amplifiers comprising said source of error signals.

5. The continuous synaptic weight-update device of claim 1 wherein:
said first driving means includes a first bi-directional current source for injecting a first current onto a first signal input node, said first current derived from a source of input signals, a first diode-connected MOS transistor connected between a first reference voltage and said first signal input node, a second diode-connected MOS transistor connected between a second reference voltage and said first input signal node, and means responsive to the voltage on said first input signal node for driving a voltage onto said first signal input line, and a second bi-directional current source for injecting a second current onto a first error input node, said second current derived from a source of error signals, a third diode-connected MOS transistor connected between said first reference voltage and said first error input node, a fourth diode-connected MOS transistor connected between said second reference voltage and said first error input node, and means responsive to the voltage on said first error input node for driving a voltage onto said first error input line; and
said second driving means includes a third bi-directional current source for injecting a third current onto a second signal input node, said third current derived from said source of input signals, a fifth diode-connected MOS transistor connected between said third reference voltage and said second input signal node, a sixth diode-connected MOS transistor connected between a fourth reference voltage and said second input signal node, and means responsive to the voltage on said second input signal node for driving a votlage onto said second signal input line, and a fourth bi-directional current source for injecting a fourth current onto a fourth signal input node, said fourth current derived from said source of error signals, a seventh diode-connected MOS transistor connected between said third reference votlage and said second error input node, an eighth diode-connected MOS transistor connected between said fourth reference voltage and said second error signal node, and means responsive to the voltage on said second error signal node for driving a voltage onto said second error input line.

6. The continuous synaptic weight-update device of claim 1 wherein said floating node comprises the gate of at least one MOS transistor in a synaptic element.

7. A synaptic element comprising:
at least one MOS transistor including a drain, a source, and a gate, the drain of said MOS transistor connected to an output summing node;
a single floating node having a capacitance associated therewith, said floating node comprising at least a portion of said gate of said at least one MOS transistor;
first and second signal input lines;
first and second error input lines;
electron tunneling means, connected to said floating node, for tunneling electrons from said floating node;
hot electron injecting means, connected to said floating node, for injecting hot electrons onto said floating node;
first driving means for driving voltages on said first signal input line and said first error input line in opposite directions with respect to a first reference votlage when it is desired to remove electrons from said floating node;
second driving means for driving voltages on said second signal input lines and said second error input line in opposite directions with respect to a second reference voltage when it is desired to place electrons onto said floating node;
first control means, responsive to signals on said first signal input line and said first error input line, for activating said electron tunneling means; and
second control means, responsive to signals on said second signal input line and said second error input line, for activating said hot electron injecting means.

8. The synaptic element of claim 7 wherein said first control means comprises a first MOS transistor having a source and drain connected between said first signal input line and said electron tunneling means and a gate connected to said first error input line and a second MOS transistor having a source and drain connected between said first error input line and said electron tunneling means and a gate connected to said first signal input line and wherein said second control means comprises a third MOS transistor having a source and drain connected between said second signal input line and said hot electron injecting means and a gate connected to said second error input line and a fourth MOS transistor having a source and drain connected between said second error input line and said hot electron injecting means and a gate connected to said second signal input line.

9. The continuous synaptic weight-update device of claim 7 wherein:
said first driving means includes a first bi-directional current source for injecting a first current onto a first signal input node, said first current derived from a source of input signals, a first diode-connected MOS transistor connected between a first reference voltage and said first signal input node, a second diode-connected MOS transistor connected between a second reference voltage and said first input signal node, and means responsive to the voltage on said first input signal node for driving a voltage onto said first signal input line, and a second bi-directional current source for injecting a second current onto a first error input node, said second current derived from a source of error signals, a third diode-connected MOS transistor connected between said first reference voltage and said first error input node, a fourth diode-connected MOS transistor connected between said second reference voltage and said first error input node, and means responsive to the voltage on said first error input node for driving a voltage onto said first error input line, and said second driving means includes a third bi-directional current source for injecting a third current onto a second signal input node, said third current derived from said source of input signals, a fifth diode-connected MOS transistor connected between a third reference voltage and said second input signal node, a sixth diode-connected MOS transistor connected between a fourth second reference voltage and said second input signal node, and means responsive to the voltage on said second input signal node for driving a voltage onto said second signal input line, and a fourth bi-directional current source for injecting a fourth current onto a fourth signal input node, said fourth current derived from said source of error signals, a seventh diode-connected MOS transistor connected between said third reference voltage and said second error input node, an eighth diode-connected MOS transistor connected between said fourth reference voltage and said second error signal node, and means responsive to the voltage on said second error signal node for driving a voltage onto said second error input line.

10. The continuous synaptic weight-update device of claim 9, further including summing means for generating an output voltage from the current present on said output summing node and wherein said first, second, third, and fourth bi-directional current sources comprise first, second, third, and fourth differential transconductance amplifiers, one input of said first and third differential transconductance amplifiers connected to said source of input signals, one input of said second and fourth differential transconductance amplifiers connected to the output of said summing means and the other input of said second and fourth differential transconductance amplifiers connected to a source of desired-output signals.

11. The synaptic element of claim 9 wherein said first, second, third, and fourth bi-directional current sources comprise transconductance amplifiers.

12. The synaptic element of claim 9 wherein said means responsive to the voltage on said first input signal node for driving a voltage onto said first signal input line, said means responsive to the voltage on said first error input node for driving a voltage onto said first error input line, said means responsive to the voltage on said second input signal node for driving a voltage onto said second signal input line, and said means responsive to the voltage on said second error signal node for driving a voltage onto said second error input line comprise buffer amplifiers.

13. A synaptic array comprising:
a plurality of synaptic elements, each of said synaptic elements associated with a row and a column of said array, each of said synaptic elements including at least one MOS transistor having a drain, a source, and a gate, each synaptic element having an output node;

a continuous weight-update structure associated with each of said synaptic elements, each of said continuous weight-update structures including a single floating node having a capacitance associated therewith, said floating node comprising at least a portion of said gate of said at least one MOS transistor, first and second signal input nodes, first and second error input nodes, electron tunneling means, connected to said floating node, for tunneling electrons from said floating node, hot electron injecting means, connected to said floating node, for injecting hot electrons onto said floating node, first control means, responsive to signals on said first signal input node and said first error input node, for activating said electron tunneling means, and second control means, responsive to signals on said second signal input node and said second error input node, for activating said hot electron injecting means;

a first signal input line and a second signal input line associated with each row in said array, said first signal input line of each row connected to the first signal input node of each of said synaptic elements associated with that row and said second signal input line of each row connected to the second signal input node of each of said synaptic elements associated with that row;

a first error input line and a second error input line associated with each column in said array, said first error input line of each column connected to the first error input node of each of said synaptic elements associated with that column and said second error input line of each column connected to the second error input node of each of said synaptic elements associated with that column;

a plurality of first driving means, one of said plurality of first driving means associated with each row and column of said array, for driving voltages on said first signal input line and said first error input line of its row and column in opposite directions with respect to a first reference voltage when it is desired to remove electrons from the floating node in the one of said synaptic elements located at the intersection of said row and column;

a plurality of second driving means, one of said plurality of second driving means associated with each row and column in said array, for driving voltages on said second signal input line and said second error input line of its row and column in opposite directions with respect to a second reference voltage when it is desired to place electrons onto the floating node in the one of said synaptic elements located at the intersection of said row and column; and an output summing line associated with each column in said array, each output summing line connected to the output nodes of each of said plurality of synaptic elements associated with that column.

14. The array of claim 13 wherein each of said first driving means includes a first bi-directional current source for injecting a first current onto said first signal input line for its row in said array, said first current derived from a first source of input signals, a second bi-directional current source for injecting a second current onto said first error input line for its column in said array, said second current derived from a first source of error signals, and wherein each of said second driving means includes a third bi-directional current source for injecting a third current onto said second signal input line for its row in said array, said third current derived from a second source of input signals, and a fourth bi-directional current source for injecting a fourth current onto said second error input line for its column in said array, said fourth current derived from a second source of error signals.

15. The array of claim 13 wherein:
each of said first driving means includes a first bi-directional current source for injecting a first current onto a first driver signal input node, said first current derived from a source of input signals, a first diode-connected MOS transistor connected between a first reference voltage and said first driver signal input node, a second diode-connected MOS transistor connected between a second reference voltage and said first driver input signal node, and means responsive to the voltage on said first driver input signal node for driving a voltage onto said first signal input line, and a second bi-directional current source for injecting a second current onto a first driver error input node, said second current derived from a source of error signals, a third diode-connected MOS transistor connected between said first reference voltage and said first driver error input node, a fourth diode-connected MOS transistor connected between said second reference voltage and said first driver error input node, and means responsive to the voltage on said first driver error input node for driving a voltage onto said first error input line, and
each of said second driving means includes a third bi-directional current source for injecting a third current onto a second driver signal input node, said third current derived from said source of input signals, a fifth diode-connected MOS transistor connected between a third reference voltage and said second driver input signal node, a sixth diode-connected MOS transistor connected between a fourth reference voltage and said second driver input signal node, and means responsive to the voltage on said second driver input signal node for driving a voltage onto said second signal input line, and a fourth bi-directional current source for injecting a fourth current onto a fourth driver signal input node, said fourth current derived from said source of error signals, a seventh diode-connected MOS transistor connected between said third reference voltage and said second driver error input node, an eighth diode-connected MOS transistor connected between said fourth reference voltage and said second driver error signal node, and means responsive to the voltage on said second driver error signal node for driving a voltage onto said second error input line.

16. The array of claim 15, further including summing means for generating an output voltage from the currents present on each of said output summing lines and wherein said first, second, third, and fourth bi-directional current sources comprise first, second, third, and fourth differential transconductance amplifiers, one input of said first and third differential transconductance amplifiers connected to said source of input signals, one input of said second and fourth differential transconductance amplifiers connected to the output of said summing means and the other input of said second and fourth differential transconductance amplifiers connected to a source of desired-output signals.

17. The synaptic element of claim 15 wherein said means responsive to the voltage on said first input signal node for driving a voltage onto said first signal input line, said means responsive to the voltage on said first error input node for driving a voltage onto said first error input line, said means responsive to the voltage on said second input signal node for driving a voltage onto said second signal input line, and said means responsive to the voltage on said second error signal node for driving a voltage onto said second error input line. comprise buffer amplifiers.

18. A continuous synaptic weight-update device comprising:
a single floating node having a capacitance associated therewith;
first and second signal input lines;
first and second error input lines;
electron tunneling means, connected to said floating node, for tunneling electrons from said floating node;
hot electron injecting means, connected to said floating node, for injecting hot electrons onto said floating node;
first driving means for driving voltages on said first signal input line and said first error input line in opposite directions with respect to a first reference voltage when it is desired to remove electrons from said floating node;
second driving means for driving voltages on said second signal input line and said second error input line in opposite directions with respect to a second reference voltage when it is desired to place electrons onto said floating node;
a first MOS transistor having a source and drain connected between said first signal input line and said electron tunneling means and a gate connected to said first error input line and a second MOS transistor having a source and drain connected between said first error input line and said electron tunneling means and a gate connected to said first signal input line;
a third MOS transistor having a source and drain connected between said second signal input line and said hot electron injecting means and a gate connected to said second error input line and a fourth MOS transistor having a source and drain connected between said second error input line and said hot electron injecting means and a gate connected to said second signal input line; and
said first and second MOS transistors formed in a well structure, said well structure biased at a fixed voltage higher than the voltage required for appreciable electron tunneling to said floating node and said first reference voltage held at a value larger than that required to excite appreciable tunneling.

19. The continuous synaptic weight-update device of claim 18 wherein said first driving means includes a first bi-directional current source for injecting a first current onto said first signal input line, said first current derived from a source of input signals, and a second bi-directional current source for injecting a second current onto said first error input line, said second current derived from a source of error signals, and wherein said second driving means includes a third bi-directional current source for injecting a third current onto said second signal input line, said third current derived from said source of input signals, and a fourth bi-directional current source for injecting a fourth current onto said fourth signal input line, said fourth current derived from said source of error signals.

20. The continuous synaptic weight-update device of claim 19 wherein said first, second, third, and fourth bi-directional current sources comprise first, second, third, and fourth transconductance amplifiers, one input of said first and third transconductance amplifiers connected to said source of input signals, the inputs of said second and fourth transconductance amplifiers derived from said source of error signals.

21. The continuous synaptic weight-update device of claim 18 wherein:
said first driving means includes a first bi-directional current source for injecting a first current onto a first signal input node, said first current derived from a source of input signals, a first diode-connected MOS transistor connected between a first reference voltage and said first signal input node, a second diode-connected MOS transistor connected between a second reference voltage and said first input signal node, and means responsive to the voltage on said first input signal node for driving a voltage onto said first signal input line, and a second bi-directional current source for injecting a second current onto a first error input node, said second current derived from a source of error signals a third diode-connected MOS transistor connected between said first reference voltage and said first error input node, a fourth diode-connected MOS transistor connected between said second reference voltage and said first error input node, and means responsive to the voltage on said first error input node for driving a voltage onto said first error input line; and
said second driving means includes a third bi-directional current source for injecting a third current onto a second signal input node, said third current derived from said source of input signals, a fifth diode-connected MOS transistor connected between said a third reference voltage and said second input signal node, a sixth diode-connected MOS transistor connected between a fourth reference voltage and said second input signal node, and means responsive to the voltage on said second input signal node for driving a voltage onto said second signal input line, and a fourth bi-directional current source for injecting a fourth current onto a fourth signal input node, said fourth current derived from said source of error signals, a seventh diode-connected MOS transistor connected between said third reference voltage and said second error input node, an eighth diode-connected MOS transistor connected between said fourth reference voltage and said second error signal node, and means responsive to the voltage on said second error signal node for driving a voltage onto said second error input line.

22. The synaptic element of claim 21 wherein said means responsive to the voltage on said first input signal node for driving a voltage onto said first signal input line, said means responsive to the voltage on said first error input node for driving a voltage onto said first error input line, said means responsive to the voltage on said second input signal node for driving a voltage onto said second signal input line, and said means responsive to the voltage on said second error signal node for driving a voltage onto said second error input line. comprise buffer amplifiers.

23. The continuous synaptic weight-update device of claim 18 wherein said floating node comprises the gate of at least one MOS transistor in a synaptic element.

24. A synaptic element comprising:
at least one MOS transistor including a drain, a source, and a gate, the drain of said MOS transistor connected to an output summing node;
a single floating node having a capacitance associated therewith, said floating node comprising at least a portion of said gate of said at least one MOS transistor;
first and second signal input lines;
first and second error input lines;
electron tunneling means, connected to said floating node, for tunneling electrons from said floating node;
hot electron injecting means, connected to said floating node, for injecting hot electrons onto said floating node;
a first MOS transistor having a source and drain connected between said first signal input line and said electron tunneling means and a gate connected to said first error input line and a second MOS transistor having a source and drain connected between said first error input line and said electron tunneling means and a gate connected to said first signal input line;
a third MOS transistor having a source and drain connected between said second signal input line and said hot electron injecting means and a gate connected to said second error input line and fourth MOS transistor having a source and drain connected between said second error input line and said hot electron injecting means and a gate connected to said second signal input line; and
said first and second MOS transistors formed in a well structure, said well structure biased at a fixed voltage higher than the voltage required for appreciable electron tunneling to said floating node and said first reference voltage held at a value larger than that required to excite appreciable tunneling.

25. The continuous synaptic weight-update device of claim 24 wherein:
said first driving means includes a first bi-directional current source for injecting a first current onto a first signal input node, said first current derived from a source of input signals, a first diode-connected MOS transistor connected between a first reference voltage and said first signal input node, a second diode-connected MOS transistor connected between a second reference voltage and said first input signal node, and means responsive to the voltage on said first input signal node for driving a voltage onto said first signal input line, and a second bi-directional current source for injecting a second current onto a first error input node, said second current derived from a source of error signals, a third diode-connected MOS transistor connected between said first reference voltage and said first error input node, a fourth diode-connected MOS transistor connected between said second reference voltage and said first error input node, and means responsive to the voltage on said first error input node for driving a voltage onto said first error input line, and said second driving means includes a third bi-directional current source for injecting a third current onto a second signal input node, said third current derived from said source of input signals, a fifth diode-connected MOS transistor connected between a third reference voltage and said second input signal node, a sixth diode-connected MOS transistor connected between a fourth reference voltage and said second input signal node, and means responsive to the voltage on said second input signal node for driving a voltage onto said second signal input line, and a fourth bi-directional current source for injecting a fourth current onto a fourth signal input node, said fourth current derived from said source of error signals, a seventh diode-connected MOS transistor connected between said third reference voltage and said second error input node, an eighth diode-connected MOS transistor connected between said fourth reference voltage and said second error signal node, and means responsive to the voltage on said second error signal node for driving a voltage onto said second error input line.

26. The continuous synaptic weight-update device of claim 25, further including summing means for generating an output voltage from the current present on said output summing node and wherein said first, second, third, and fourth bi-directional current sources comprise first, second, third, and fourth differential transconductance amplifiers, one input of said first and third differential transconductance amplifiers connected to said source of input signals one input of said second and fourth differential transconductance amplifiers connected to the output of said summing means and the other input of said second and fourth differential transconductance amplifiers connected to a source of desired-output signals.

27. The synaptic element of claim 25 wherein said first, second, third, and fourth bi-directional current sources comprise transconductance amplifiers.

28. The synaptic element of claim 25 wherein said means responsive to the voltage on said first input signal node for driving a voltage onto said first signal input line, said means responsive to the voltage on said first error input node for driving a voltage onto said first error input line, said means responsive to the voltage on said second input signal node for driving a voltage onto said second signal input line, and said means responsive to the voltage on said second error signal node for driving a voltage onto said second error input line comprise buffer amplifiers.

29. A synaptic array comprising:
a plurality of synaptic elements, each of said synaptic elements associated with a row and a column of said array, each of said synaptic elements including at least one MOS transistor having a drain, a source, and a gate, each synaptic element having an output node;
a continuous weight-update structure associated with each of said synaptic elements, each of said continuous weight-update structures including a single floating node having a capacitance associated therewith, said floating node comprising at least a portion of said gate of said at least one MOS transistor, first and second signal input nodes, first and second error input nodes, electron tunneling means, connected to said floating node, for tunneling electrons from said floating node, hot electron injecting means, connected to said floating node, for injecting hot electrons onto said floating node, a first MOS transistor having a source and drain connected between said first signal input node and said electron tunneling means and a gate connected to said first error input node, a second MOS transistor having a source and drain connected between said first error input node and said electron tunneling means and a gate connected to said first signal input node, a third MOS transistor having a source and drain connected between said second signal input node and said hot electron injecting means and a gate connected to said second error input node, a fourth MOS transistor having a source and drain connected between said second error input node and said hot electron injecting means and a gate connected to said second signal input node, said first, second, third, and fourth MOS transistors formed in a well structure, said well structure biased at a fixed voltage higher than the voltage required for appreciable electron tunneling to said floating node and said second reference voltage held at a value larger than that required to excite appreciable tunneling;
a first signal input line and a second signal input line associated with each row in said array, said first signal input line of each row connected to the first signal input node of each of said synaptic elements associated with that row and said second signal input line of each row connected to the second signal input node of each of said synaptic elements associated with that row;
a first error input line and a second error input line associated with each column in said array, said first error input line of each column connected to the first error input node of each of said synaptic elements associated with that column and said second error input line of each column connected to the second error input node of each of said synaptic elements associated with that column;
a plurality of first driving means, one of said plurality associated with each row and column of said array, for driving voltages on said first signal input line and said first error input line of its row and column in opposite directions with respect to a first reference voltage when it is desired to remove electrons from the floating node in the one of said synaptic elements located at the intersection of said row and column;
a plurality of second driving means, one of said plurality associated with each row and column in said array, for driving voltages on said second signal input line and said second error input line of its row and column in opposite directions with respect to a second reference voltage when it is desired to place electrons onto the floating node in the one of said synaptic elements located at the intersection of said row and column;
an output summing line associated with each column in said array, each output summing line connected to the output nodes of each of said plurality of synaptic elements associated with that column.

30. The array of claim 29 wherein each of said first driving means includes a first bidirectional current source for injecting a first current onto said first signal input line for its row in said array, said first current derived from a first source of input signals, a second bi-directional current source for injecting a second current onto said first error input line for its column in said array, said second current derived from a first source of error signals, and wherein each of said second driving means includes a third bi-directional current source for injecting a third current onto said second signal input line for its row in said array, said third current derived from a second source of input signals, and a fourth bi-directional current source for injecting a fourth current onto said second error input line for its column in said array, said fourth current derived from a second source of error signals.

31. The array of claim 29 wherein:

each of said first driving means includes a first bi-directional current source for injecting a first current onto a first driver signal input node, said first current derived from a source of input signals, a first diode-connected MOS transistor connected between a first reference voltage and said first driver signal input node, a second diode-connected MOS transistor connected between a second reference voltage and said first driver input signal node, and means responsive to the voltage on said first driver input signal node for driving a voltage onto said first signal input line, and a second bi-directional current source for injecting a second current onto a first driver error input node, said second current derived from a source of error signals, a third diode-connected MOS transistor connected between said first reference voltage and said first driver error input node, a fourth diode-connected MOS transistor connected between said second reference voltage and said first driver error input node, and means responsive to the voltage on said first driver error input node for driving a voltage onto said first error input line, and each of said second driving means includes a third bi-directional current source for injecting a third current onto a second driver signal input node, said third current derived from said source of input signals, a fifth diode-connected MOS transistor connected between a third reference voltage and said second driver input signal node, a sixth diode-connected MOS transistor connected between a fourth reference voltage and said second driver input signal node, and means responsive to the voltage on said second driver input signal node for driving a voltage onto said second signal input line, and a fourth bi-directional current source for injecting a fourth current onto a fourth driver signal input node, said fourth current derived from said source of error signals, a seventh diode-connected MOS transistor connected between said third reference voltage and said second driver error input node, an eighth diode-connected MOS transistor connected between said fourth reference voltage and said second driver error signal node, and means responsive to the voltage on said second driver error signal node for driving a voltage onto said second error input line.

32. The array of claim 31, further including summing means for generating an output voltage from the currents present on each of said output summing lines and wherein said first, second, third, and fourth bi-directional current sources comprise first, second, third, and fourth differential transconductance amplifiers, one input of said first and third differential transconductance amplifiers connected to said source of input signals, one input of said second and fourth differential transconductance amplifiers connected to the output of said summing means and the other input of said second and fourth differential transconductance amplifiers connected to a source of desired-output signals.

33. The synaptic element of claim 31 wherein said means responsive to the voltage on said first input signal node for driving a voltage onto said first signal input line, said means responsive to the voltage on said first error input node for driving a voltage onto said first error input line, said means responsive to the voltage on said second input signal node for driving a voltage onto said second signal input line, and said means responsive to the voltage on said second error signal node for driving a voltage onto said second error input line. comprise buffer amplifiers.

34. A continuous learning system comprising:

an array of synaptic elements arranged in rows and columns on the surface of an integrated circuit, an input signal associated with each row of said array, an error signal associated with each column of said array, input conductors aligned with the rows of said synaptic elements, error conductors aligned with the columns of said synaptic elements, driving means for encoding said input signals into voltages on said input conductors, driving means for encoding said error signals into voltages on said error conductors, each synaptic element comprising:

a single floating node, electron tunneling means, connected to said floating node, for tunneling electrons from said floating node, hot electron injection means, connected to said floating node, for injecting electrons onto said floating node, control means, responsive to the voltages on the input conductors associated with the row in which said synaptic element is located, and to the voltages on the error conductors associated with the column in which said synaptic element is located, for activating said electron tunneling means when the product of the error signal and the input signal is of a first sign, and for activating said hot electron injection means when the product of the error signal and the input signal is of a second sign, opposite to said first sign.

* * * * *